Oct. 27, 1959 E. M. JONES 2,910,684

DATA CONVERSION SYSTEM

Filed April 25, 1955

Inventor
Edward M. Jones
Alois W. Graf
Attorney

United States Patent Office 2,910,684

Patented Oct. 27, 1959

2,910,684

DATA CONVERSION SYSTEM

Edward M. Jones, Cincinnati, Ohio, assignor to The Baldwin Piano Company, Cincinnati, Ohio, a corporation of Ohio Application April 25, 1955, Serial No. 503,665

9 Claims. (Cl. 340—347)

This invention relates to improvements in data conversion systems, and more particularly to such systems known as angular encoders.

Angular encoders in the form of digital code discs, as discussed for example by J. Kernahan in the April 1954 Bell Laboratories Record, pages 126 to 131, inclusive, have been known for some time. In the practical use of such code discs, the occurrence of pin holes and black specks in the coded areas has been a problem which has plagued those concerned with perfecting the coded discs. The use of such discs has been impeded by errors introduced by such imperfections, since as much as twenty percent of the light rays may be transmitted or prevented from being transmitted thereby.

Another problem in the use of such code discs has been due to changes in intensity of the radiant energy source, such as may occur due to aging of such source. Such changes, if not compensated for, may result in failure of the photocells to produce an adequate output when such is indicated by the coding of the disc. The same problem has arisen as a result of changes in the sensitivity of the whole group of photocells used, as may occur as a result of temperature or humidity changes or the aging of the photocells. The present device solves these problems by using a reference photocell in conjunction with a delay line-comparator system.

Accordingly, it is an object of this invention to provide a new and improved data conversion system.

Another object of this invention is to provide an improved data conversion system in which a reference photocell is used to minimize the effects of changes in intensity of the radiant source used in connection with the manufacture and utilization of the code discs.

Another object of this invention is to provide an improved data conversion system in which a reference photocell is used to set the threshold level at which each photocell operates.

Another object of this invention is to provide an improved data conversion system in which a reference photocell adjusts for changes in the average sensitivity of the whole group of photocells used.

Another object of this invention is to provide an improved data conversion system in which the data signals are compared with a reference signal after being arranged in serial form by a delay line.

Other objects and advantages of the invention will be apparent during the course of the following description when read in connection with the accompanying drawing, wherein.

Figure 1:
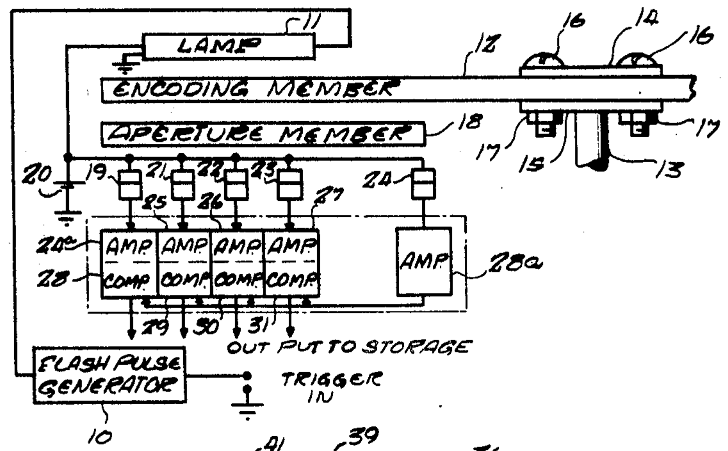
Figure 1 is a functional block diagram explaining some of the novel features of this device.

Referring now more particularly to Figure 1, there is shown a flash pulse generator 10 which, upon being energized by an external trigger, will supply a pulse of sufficient voltage and current to cause a lamp 11 to radiate energy in the direction of an encoding member 12. The encoding member 12 may be a disc mounted rotatably on the end of a shaft 13 and affixed thereto by means of an upper plate 14 and a lower plate 15 which are attached to the encoding member 12 by means of bolts 16 and nuts 17. The code disc 12 contains a plurality of concentric rings made up of alternately transparent and opaque areas. Light from the lamp 11 passes through the code disc and an aperture member 18 having a narrow slit to a series of photoconductive detectors 19, 21, 22 and 23 behind the disc. A direct current source 20 is connected to energize the photocells 19 to 24 which source also supplies direct current to the lamp 11. It should be noted that the photocells require a substantially lower D.C. voltage than the lamp 11, and an appropriate resistance network (not shown) must be used in connection with the D.C. supply for the photocells. In any shaft position, the arrangement of the four transparent and opaque areas along the radius line containing the photocells represents a particular number.

Though there has been shown only a four digit angular encoder, it should, of course, be understood that an encoder having a larger number of digits may be readily provided by increasing the number of code rings, photo detectors and associated circuitry to be described.

An additional photocell 24 is provided to serve as a reference photocell. This reference photocell is preferably mounted adjacent to the other photocells and receives light either through a clear circular track on the disc or from a space just at the edge of the disc. A light filter in front of this reference photocell, or a smaller load resistor connected to the photocell, is arranged so that this photocell puts out a signal equal to fifty percent of the signal normally received by the other photocells 19 to 23 when they are receiving light from clear areas on the track of the disc. The outputs of photocells 19 to 23 are fed to amplifiers **24*a* to 27, respectively, and the output of reference photocell 24 is fed to an amplifier 28*a***.

The outputs of amplifiers **24*a* to 27 are fed to comparators 28 to 31, respectively, where they are compared with the output of the amplifier 28*a*. Each of the comparison circuits puts out a pulse of uniform amplitude if its photocell produces a signal of greater amplitude than the reference photocell 24**, but puts out no signal if the regular photocell signal is less than the reference photocell signal. The output of the comparators in a typical embodiment actuate a storage device which stores the information until needed. It could, of course, directly actuate an end device.

As is readily seen, this embodiment requires a separate comparator unit for each regular photocell 19 to 23 and a separate pulse generator stage for each comparator circuit 28 to 31.

Figures 2, 3:
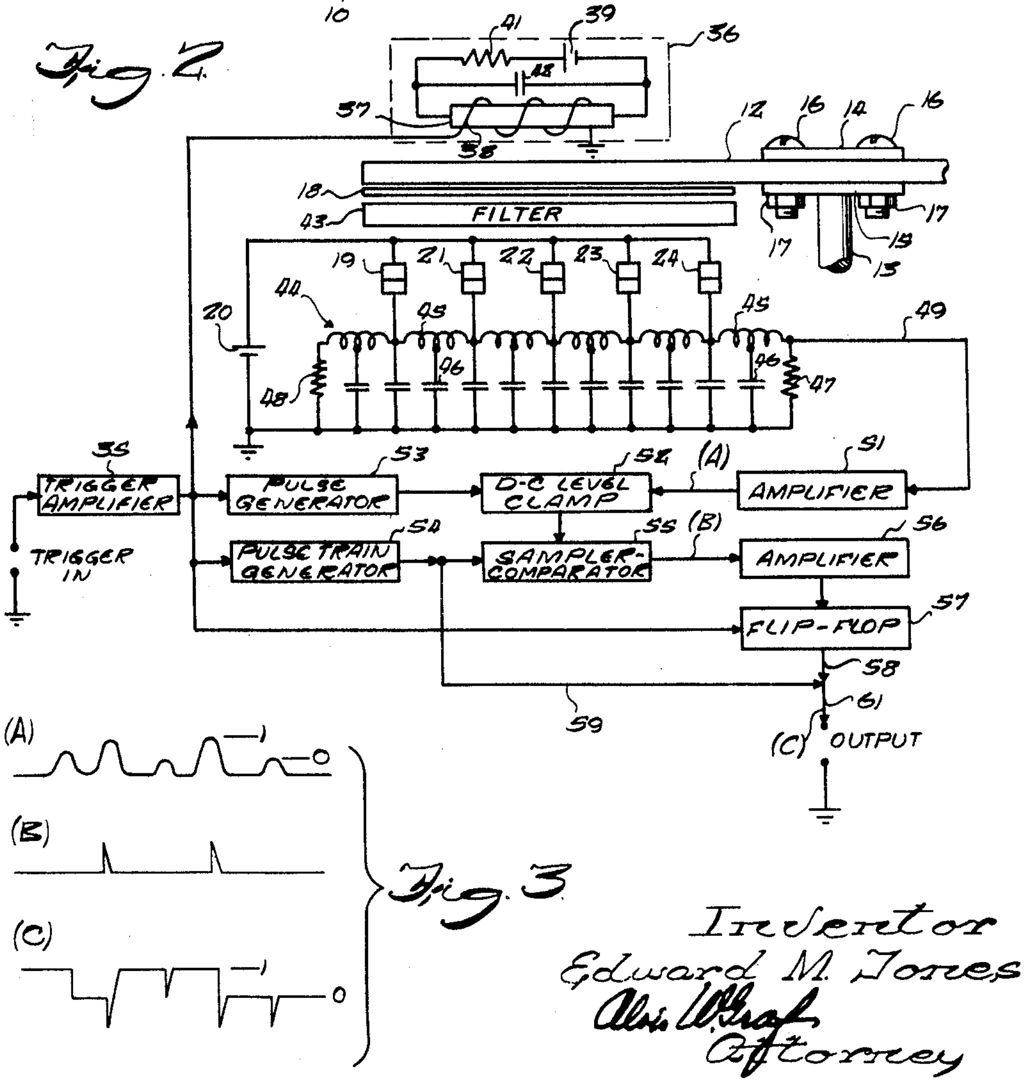
Figure 2 is a part block, part schematic diagram of a system embodying the novel features of this device.
Figure 3 shows typical wave forms at locations (A), (B) and (C) of Figure 2.

In Figure 2 there is shown an embodiment, which through the utilization of a pulse delay means in the form of a delay line substantially reduces the number of components and leads. This delay line puts the information into serial form, simplifying the transformation of the code from cyclic to straight binary form. The trigger amplifier 35 corresponds to the flash pulse generator 10, and is similarly energized to actuate a radiant energy source 36 of well known design.

The radiant energy source 36 includes a flash lamp 37, around which is wound an energizing coil 38 which is excited by the already mentioned trigger amplifier 35. Applied across the flash lamp 37 is a D.C. voltage from a source 39 in series with a resistor 41. A capacitor 42 is also connected across the flash lamp 37 and charges up to the level of the voltage source 39 during periods when the actuating coil 38 is not energized.

The encoding member 12 illuminated by the radiant energy source 36 is similar to that shown in Figure 1, and like numerals are applied. A filter 43 is inserted beneath the aperture member 18 to compensate for the attenuation of the delay line 44. Photocells 19 to 24 are arranged in the same manner as described in connection with Figure 1. A direct current source 20 is connected to energize the photocells 19 to 24 which may be of the NP transistor type.

The multisection delay line 44, which consists of sections of inductance 45 and capacitance 46, is terminated at its ends by resistors 47 and 48, respectively. The outputs of the photocells 19 to 24 are connected at various sectional points along the delay line so as to space the pulses appearing at the output of the line across resistor 47 by discrete time intervals from one another. The output of the delay line is fed through a conductor 49 to an amplifier 51. In the typical embodiment shown, the reference pulse will appear first in order of time sequence followed by the most significant digit, in turn followed by the other digits in sequence, with the least significant digit occurring last.

The output of the amplifier 51, which may be as illustrated at (A) in Figure 3, is applied to a D.C. level clamp or automatic gain control 52 to establish the level of the peak of the pulse from the reference photocell at a fixed voltage. A suitable clamping circuit is illustrated in Figure 7–34 on page 140 of Electron-Tube Circuits by Seely (first edition, McGraw Hill, 1950). A pulse generator 53 actuated by the trigger amplifier output 35 acts to limit the resetting of the clamp to the short time interval during which the reference pulse occurs. The D.C. level clamp 52 is set to establish the gain of the circuit by the pulse from the pulse delay line 44 initially following each light flash, this pulse being the pulse generated by the reference photocell 24 and of a magnitude approximately midway between the illuminated and dark pulses of the other cells. The function of establishing the gain can be accomplished only during the period a pulse is received from the pulse generator 53, thereby making certain that the gain level is established prior to the time when a pulse from the next photocell 23 could be impressed on the amplifier 51. Also, the gain of the circuit remains unaltered once the level clamp 52 has established it for a sufficiently long period of time to permit all pulses generated by a single light flash to pass to the sampler comparator 55.

The output of the D.C. level clamp 52 is applied in coincidence with the output of a pulse train generator 54 to a sampler-comparator 55. A suitable circuit for the latter is illustrated in Fig. 1 on page 511 of Proceedings of the IRE, volume 38, No. 5 (May 1950). Again the pulse train generator 54, which is actuated by the output of the trigger amplifier 35, acts as a cycling control to maintain time coincidence in the operation of the sampler-comparator. The sampler-comparator 55 samples each pulse to see whether it is larger or smaller in amplitude than the reference pulse, that is the pulse from the cell 24 which is smaller in magnitude than the pulses from illuminated cells but larger than the pulses from dark cells. The output of the sampler is proportional to the excess of the particular pulse with respect to the reference pulse, and discriminates against those pulses having less amplitude than the reference pulse so that the pulses from dark cells produce no output from the sampler. A typical output wave form produced by the sampler-comparator 55 is shown at (B) of Figure 3. This output is fed to an amplifier 56, and this amplified output then is fed to a flip-flop circuit 57, which may be of the Eccles-Jordan type, as specifically illustrated in Fig. 19–15 on page 420 of the above-mentioned Seely book.

If the pulse train generator 54 is made to generate pulses at the exact rate at which the delay line operates and the pulses therefrom are applied to the sampler-comparator 55, only the peaks of the pulses from the delay line 44 are sampled. By thus adjusting the exact "phase" of the pulse train, the best compromise between poor rise and decay time of the light source, photocells and delay line can be made.

Also applied to this flip-flop circuit 57 is the output of the trigger so as to assure that the flip-flop circuit 57 starts out in the zero condition at the start of each pulse train.

It is clear that with the proper pattern on the code disc 12 the sampler output pulses represent in cyclic binary code the angler position of the code disc. It is further obvious that by using these pulses to trigger the flip-flop circuit 57, a signal representing the straight binary code may be obtained.

It is probably necessary that the pulse train be presented as an output in order to synchronize the readout circuitry that would be attached to the output of the flip-flop 57. If it is desired, the outputs of the flip-flop 57 and the pulse-train generator 54 can be brought out separately.

The output of the flip-flop 57 appearing on conductor 58 is mixed with the output of the pulse train generator 54 appearing on conductor 59. Thus, the entire output information can be caused to appear on the single conductor 61. The output wave form appearing on conductor 61 is shown at (C) in Figure 3.

While there has been shown and described an invention in connection with certain specific embodiments, it will, of course be understood that it is not intended to be limited thereto, since it is apparent that the principles herein disclosed are susceptible of numerous other applications, and modifications may be made in the structural arrangement and in the instrumentalities employed without departing from the spirit and scope of the invention as set forth in the appended claims.

I claim as my invention:

1. In a data conversion system, a periodic source of radiant energy, a series of radiation sensitive devices, an encoding member interposed between said source and said devices for selectively energizing said devices with radiant energy, a reference radiation sensitive device for receiving energy from said source whenever any one of said series of devices is to be energized, a pulse delay means interconnecting each of said series of devices and said reference device, means connected to said delay means for comparing the output of said reference device with the outputs of said series of devices, and means for producing uniform pulses whenever the comparison means produces an output.

2. In a data conversion system, a source of radiant energy, a series of radiation sensitive devices, an encoding member interposed between said source and said devices for selectively energizing said devices with radiant energy, a reference radiation sensitive device for receiving energy from said source whenever any one of said series of devices is to be energized, means for limiting the output of said reference device to a fraction of the output of one of said series of devices, a delay line interconnecting each of said series of devices and said reference device, means connected to said line for comparing the output of said reference device with the outputs of said series of devices, and means for producing uniform pulses whenever the comparison means produces an output.

3. In a data conversion system, a source of radiant energy, means for periodically energizing said source of energy, a series of radiation sensitive devices, an encoding member interposed between said source and said devices for selectively energizing said devices with radiant energy, a reference radiation sensitive device for receiving energy from said source whenever any one of said series of devices is to be energized, a delay line interconnecting each of said series of devices and said reference device, means connected to said line periodically energized in synchronism with said means for energizing the radiant energy source for comparing the output of said reference device with the outputs of said series of devices, and means for producing uniform pulses whenever the comparison means produces an output.

4. In a data conversion system, a source of radiant energy, a series of radiation sensitive devices, an encoding member interposed between said source and said devices for selectively energizing said devices with radiant energy, a reference radiation sensitive device for receiving energy from said source whenever any one of said series of devices is to be energized, a delay line interconnecting each of said series of devices and said reference device, means connected to said line for comparing the output of said reference device with the outputs of said series of devices, and means for producing uniform pulses whenever the comparison means produces an output, said first means being repetitively energized at a rate determined by the time delay of said delay line.

5. In a data conversion system wherein radiant energy is passed by an encoding member to a series of radiation sensitive devices, the combination of a reference radiation sensitive device positioned to receive radiation whenever radiation is applied to said encoding member, means for limiting the output of said reference device to a predetermined portion of the normal output of any one of said series of devices when energized by radiation, means for comparing the output of said reference device with the output of each of said series of devices, and means for producing uniform amplitude pulses for each of said series of devices whenever the output of said comparing means exceeds a predetermined value.

6. In a data conversion system of the type wherein radiant energy from a source thereof is passed or not passed by a series of regions on an encoding member for affecting or not affecting, respectively, a series of photosensitive devices, the combination of a reference photosensitive device similar to said photosensitive devices of said series, said reference device being so positioned as to receive a predetermined amount of energy from said source, a voltage comparison system coupled to the output of said reference device and to the outputs of said series of photosensitive devices, said voltage comparison system being responsive to signals from said devices in said series when said signals are above the voltage level set by said reference device.

7. In a data conversion system, a source of radiant energy, a rotatable disc adjacent thereto having concentric paths of opaque and transparent areas so arranged as to provide radial combinations of said areas corresponding to a digital code, a narrow aperture aligned radially with respect to said disc, a group of photocells aligned with said aperture so as to receive radiant energy from said source when transparent areas in said disc are aligned with said aperture, a reference photocell receiving a predetermined amount of radiant energy from said source, an amplifier for each of said photocells, the amplifier for said reference photocell being connected to the amplifiers of said photocells in said group for biasing purposes, whereby the output of said amplifiers for said group is determined by the output of said reference photocell.

8. An optical encoder comprising, in combination, a light source, a code disc confronting the light source having a plurality of circular coaxial tracks consisting of transparent sectors separated by opaque sectors, means including a light responsive cell confronting each of the tracks of the disc on the side of the disc opposite the light source to generate an electrical pulse responsive to transparent sectors of the code disc, means including a light responsive reference cell confronting the light source to generate an electrical potential responsive to the intensity of the light source, and gating means connected to the potential generating means and the pulse generating means for transmitting pulses from the pulse generating means of greater amplitude than a reference potential, the relative magnitude of the reference potential and the pulse being established by the potential generating means.

9. An optical encoder comprising, in combination, a light source, a code disc confronting the light source having a plurality of circular coaxial tracks consisting of transparent sectors separated by opaque sectors, means including a light responsive cell confronting each of the tracks of the disc on the side of the disc opposite the light source to generate an electrical pulse responsive to transparent sectors of the code disc, means including a light responsive reference cell confronting the light source to generate an electrical potential responsive to the intensity of the light source, gating means connected to the potential generating means and the pulse generating means for transmitting pulses from the pulse generating means of greater amplitude than a reference potential, the relative magnitude of the reference potential and the pulse being established by the potential generating means, and means for periodically interrupting light from the light source from impinging upon the code disc.

References Cited in the file of this patent

UNITED STATES PATENTS

| | | |
|---|---|---|
| 2,517,330 | Marenholtz | Aug. 1, 1950 |
| 2,679,644 | Lippel | May 25, 1954 |
| 2,711,499 | Lippel | June 21, 1955 |
| 2,714,204 | Lippel et al. | July 26, 1955 |
| 2,745,311 | Tovbet | May 15, 1956 |
| 2,793,807 | Yaeger | May 28, 1957 |

UNITED STATES PATENT OFFICE

CERTIFICATE OF CORRECTION

Patent No. 2,910,684 October 27, 1959

Edward M. Jones

It is hereby certified that error appears in the printed specification of the above numbered patent requiring correction and that the said Letters Patent should read as corrected below.

Column 4, line 6, after "trigger" strike out "so as" and insert instead -- amplifier 35 --.

Signed and sealed this 3rd day of May 1960.

SEAL)
ttest:

ARL H. AXLINE
ttesting Officer

ROBERT C. WATSON
Commissioner of Patents